Oct. 8, 1935.   E. L. R. HOCKING   2,017,001
FLEXIBLE COUPLING FOR VEHICLE BOGIES
Filed April 10, 1934   2 Sheets-Sheet 1
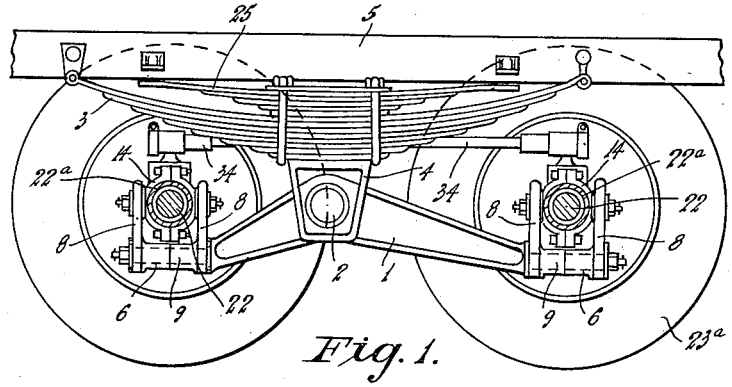
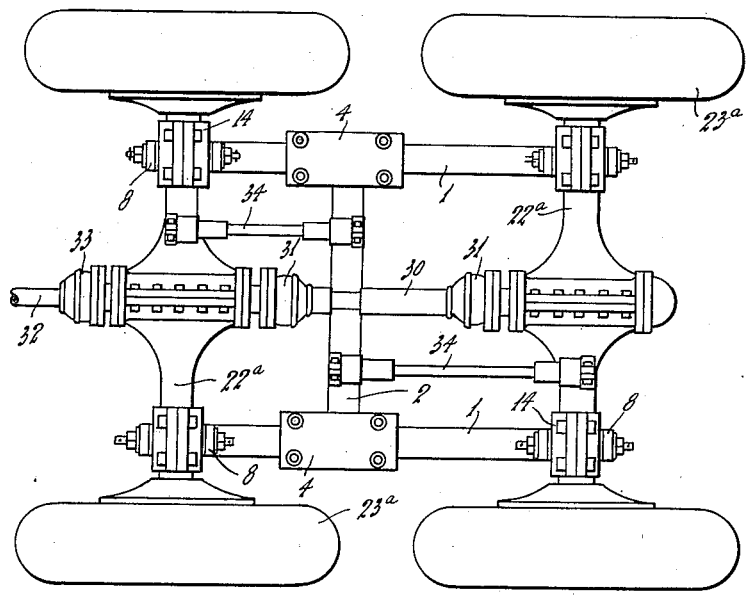
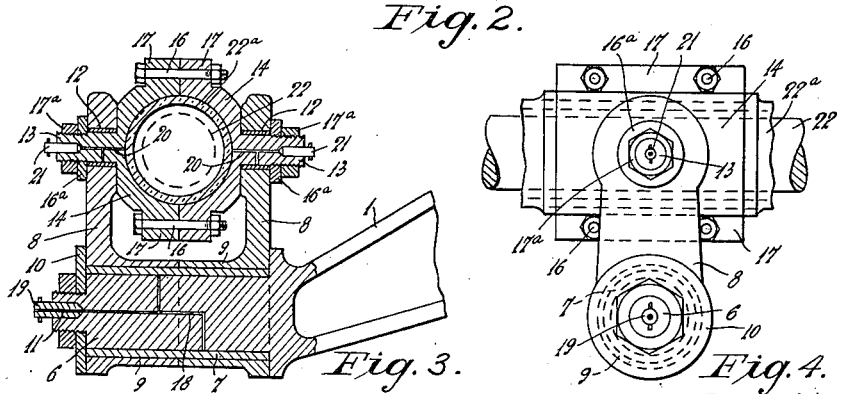
E. L. R. Hocking
INVENTOR
By: Marks & Clerk
Attys.

Oct. 8, 1935. E. L. R. HOCKING 2,017,001
FLEXIBLE COUPLING FOR VEHICLE BOGIES
Filed April 10, 1934 2 Sheets-Sheet 2
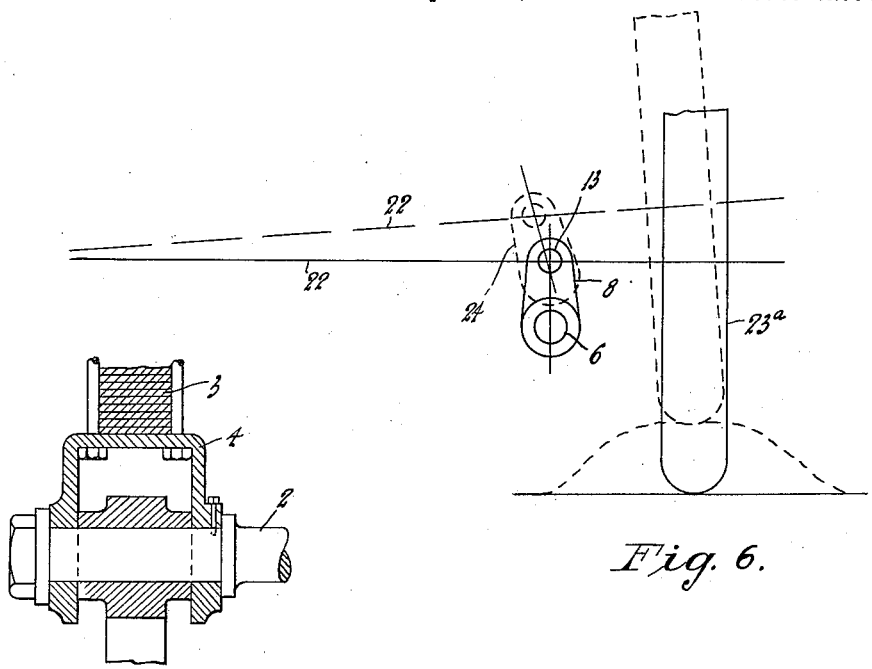
Fig. 5. Fig. 6.
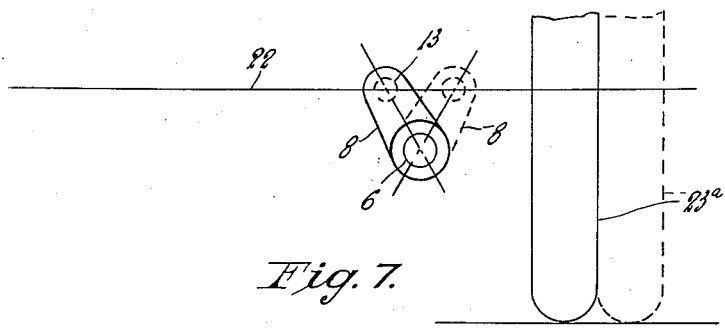
Fig. 7.
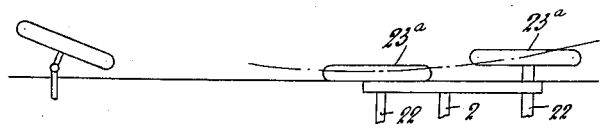
Fig. 8. E. L. R. Hocking
INVENTOR
By Marks & Clerk
Attys.

Patented Oct. 8, 1935

2,017,001

UNITED STATES PATENT OFFICE 2,017,001

FLEXIBLE COUPLING FOR VEHICLE BOGIES

Ernest Leopold Ranfurly Hocking, Wellington, New Zealand

Application April 10, 1934, Serial No. 719,965
In New Zealand May 4, 1933

5 Claims. (Cl. 280—124)

This invention relates to vehicle bogies in which the wheels are mounted whereby freedom of movement is obtained of the wheel axles. The invention particularly relates to that type of bogie in which the axles for the wheels are carried by side beams which have journal ends extending lengthwise thereof and which carry a journal member from which axles are supported, so as to allow rocking movement of the journal member.

The object of the present invention is to improve the construction of these devices and to give greater flexibility in the joint between the axle housing and the beam to aid in passing over obstructions and also in order to ensure the better tracking of the bogie wheels, particularly in the case of the vehicle following a curve, as in turning.

According to my invention, means are provided whereby the wheel axles are free to have a limited lateral movement relatively to the side beams, so as to permit of the lateral axial movement of the axles in order that the rear wheels of the bogie will follow the radius of the front wheels thereof.

In carrying out the invention, the side beams of the frame have provided at their ends journals with a longitudinal axis, and upon these journals are mounted brackets each having journal openings parallel with the journal ends of the beam to receive pins or stub axles from a ring fitted as a bearing to the wheel axle housing. These brackets act as links between the wheel axles and the side beam journals.

The invention will be described with the aid of the accompanying drawings, wherein:—

Figure 1 is a side elevation of a road vehicle bogie.

Figure 2 is a plan.

Figure 3 is a cross section through a bracket and ring upon the wheel axle housing.

Figure 4 is an end view of Fig. 3.

Figure 5 is a cross section of the bracket to which the beams are anchored.

Figures 6 to 8 are diagrams.

Referring to the drawings, the side frames consist of beams 1 mounted to rock pivotally on a transverse shaft 2 fixed in brackets 4 to which springs 3 are attached, the springs being attached at their ends to the chassis 5 (see Figures 1 and 5).

At each end of the beams 1 are provided integral journal ends 6, each of which receives a sleeve 7 to rotate thereon and on this sleeve brackets 8 are placed. These brackets are in two parts, the lower end of each having bosses 9 with internal cylindrical bearing surfaces to fit and rotate on the sleeve 7 and held in position by a plate 10 held by a nut 11. The upper ends of the brackets 8 have journal openings 12 parallel with the axis of the journal ends 6. These journal openings 12 receive stub axles 13 of a bearing ring 14 formed in two parts secured together by bolts 16 passing through lugs 17, and having a plate 16a and nut 17a thereon to prevent the brackets spreading. When the two parts of the ring are bolted over the wheel axle housing 22a, it will form a bearing and support for the axle housing with freedom for any rotatory movement that may take place.

Oil ducts 18 in the journal ends 6 of the beams lead to the journal surfaces on which the sleeves run, while a grease nipple 19 is formed on the stud 11 which is hollow to permit the grease to pass to the ducts 18. Other ducts 20 in the stub axles 13 lead to the bearing surfaces thereof, the exterior being provided with grease nipples 21. The wheel axles are referenced 22 and the wheels 23a.

The driving gear for the axles is contained in the housings 22a of the axles, and in the case of both axles being driven, the shaft 30 between the two axles has two universal joints 31 to make it flexible in order to allow of movement of one housing relative to the other. It also is provided with a certain amount of extensibility, since the lateral movements of the wheel axles lengthen or shorten the distance between the two universal joints. The usual driving shaft 32 has a universal joint 33 at its end. Torque rods 34 are provided on the transverse shaft 2 and on the housings 22a as shown, these being necessary since these housings are movable relatively to the side beams 1.

Upon a wheel 23a at one end of the wheel axle 22 sinking, or the other one rising, as in the case of passing over a depression or obstruction (see Figure 6), the wheel axle 22 is thrown out of its normal horizontal position, as in dotted lines in the diagram, the journal end of the beam rising to the position indicated at 24; the brackets 8 acting as links permit the axle to move laterally and both wheels to assume a tilted angle from the vertical without the tread of the wheel passing out of alignment with the track, thus avoiding the tread being forced sideways on the track.

Figure 8 indicates how the bogie wheels will track when the vehicle is following a curve or turning. The brackets 8 of the front axle of the bogie swing towards one side, as in full lines in Figure 7, and the brackets of the rear axle swing to the other side, as in dotted lines in Figure 7, so that the rear wheels follow the track of the front wheels of the bogie and no skid, or very little, will take place.

If desired, a helper spring 25 (see Figure 1) may be used between the spring 3 and the chassis.

What I claim is:—

1. In a vehicle having a chassis, the combination of side beams provided with journals at their ends, means for medially connecting the beams to the chassis, a pair of parallel tandem axles provided with wheels and housings and parallel linked connections pivotally connecting the ends of each axle housing to the corresponding ends of the side beams, each link including a ring-like member pivotally mounted in said link and in alignment with the adjacent journal of the side beams and supported on the axle housing, and each link provided with a bearing for receiving the journals whereby the axles may move laterally of the chassis.

2. In a vehicle having a chassis, the combination as claimed in claim 1 wherein the ring-like members for supporting the axle housings include two semi-circular members, each provided with stub axles and wherein each link is U-shaped, the two arms being provided with bearings for receiving the stub axles.

3. In a vehicle having a chassis, the combination as claimed in claim 1, including a transverse shaft mounted on the chassis, the side beams being medially and pivotally connected to said transverse shaft and torque rods pivotally connected to said shaft and to the axle housings.

4. In a vehicle having a chassis, the combination as claimed in claim 1 including differential driving means in engagement with each axle, and a flexible shaft connecting said differential driving means.

5. In a vehicle having a chassis, the combination as claimed in claim 1, wherein the means for medially connecting the beams to the chassis include a main leaf spring and a supplemental helper leaf spring.

ERNEST L. R. HOCKING.